United States Patent [19]
Abe et al.

[11] Patent Number: 5,938,998
[45] Date of Patent: Aug. 17, 1999

[54] METHOD AND APPARATUS FOR MANUFACTURING COMPOSITE INSULATORS

[75] Inventors: Tetsuhiko Abe, Kasugai; Shigeo Ishino, Niwa-Gun, both of Japan

[73] Assignee: NGK Insulators, Ltd., Japan

[21] Appl. No.: 08/622,360

[22] Filed: Mar. 25, 1996

[30] Foreign Application Priority Data

Mar. 28, 1995 [JP] Japan .................................. 7-069324

[51] Int. Cl.$^6$ ........................... B29C 35/00; B29C 65/02
[52] U.S. Cl. ................ 264/171.13; 156/244.22; 156/294; 264/40.7; 264/171.15; 264/236; 264/294; 264/347; 425/113; 425/114; 425/135; 425/502
[58] Field of Search ......................... 264/171.12, 171.13, 264/171.15, 294, 40.7, 297.5, 236, 347; 425/113, 114, 501, 502, 506, 135; 156/86, 294, 244.22

[56] References Cited

U.S. PATENT DOCUMENTS

| | | |
|---|---|---|
| 3,898,372 | 8/1975 | Kalb . |
| 4,312,123 | 1/1982 | Wheeler .................................. 156/294 |
| 4,505,033 | 3/1985 | Wheeler .................................. 156/294 |
| 4,724,284 | 2/1988 | Wheeler .................................. 156/294 |
| 4,749,824 | 6/1988 | Orbeck . |

FOREIGN PATENT DOCUMENTS

| | | |
|---|---|---|
| 54-65392 | 5/1979 | Japan . |
| 61-181015 | 8/1986 | Japan . |

*Primary Examiner*—Mathieu D. Vargot
*Attorney, Agent, or Firm*—Parkhurst & Wendel

[57] ABSTRACT

Method and apparatus for manufacturing a composite insulator which includes an FRP core rod covered by a sheath and provided with a plurality of sheds which are made of an electrically insulating polymeric material. The sheds are set on a support member arranged on a downstream side of an extruder. The extruder is fed with a core rod and extrudes a polymeric material to form a sheath on the core rod. The core rod with the sheath is moved toward the downstream side through an opening in the support member. The sheds are sequentially moved along the support member toward the downstream side and transferred onto predetermined locations on the sheath that have passed through the opening and have reached the downstream side. An assembly is thus formed which includes the core rod, sheath formed on the core rod, and sheds transferred onto the sheath. The assembly is then heated to vulcanize the sheath and adhere it to the core rod and the sheds.

8 Claims, 3 Drawing Sheets

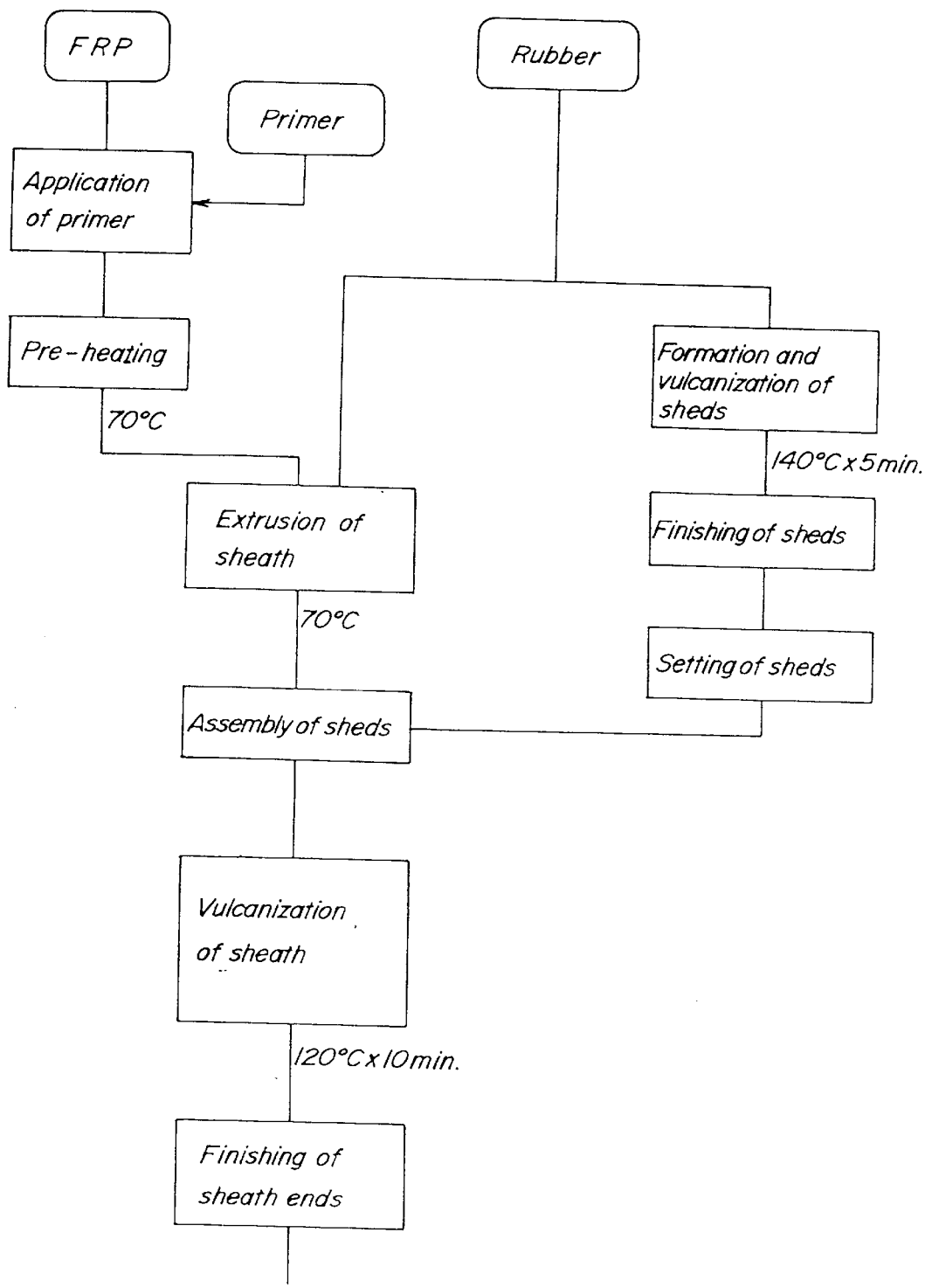
FIG_1

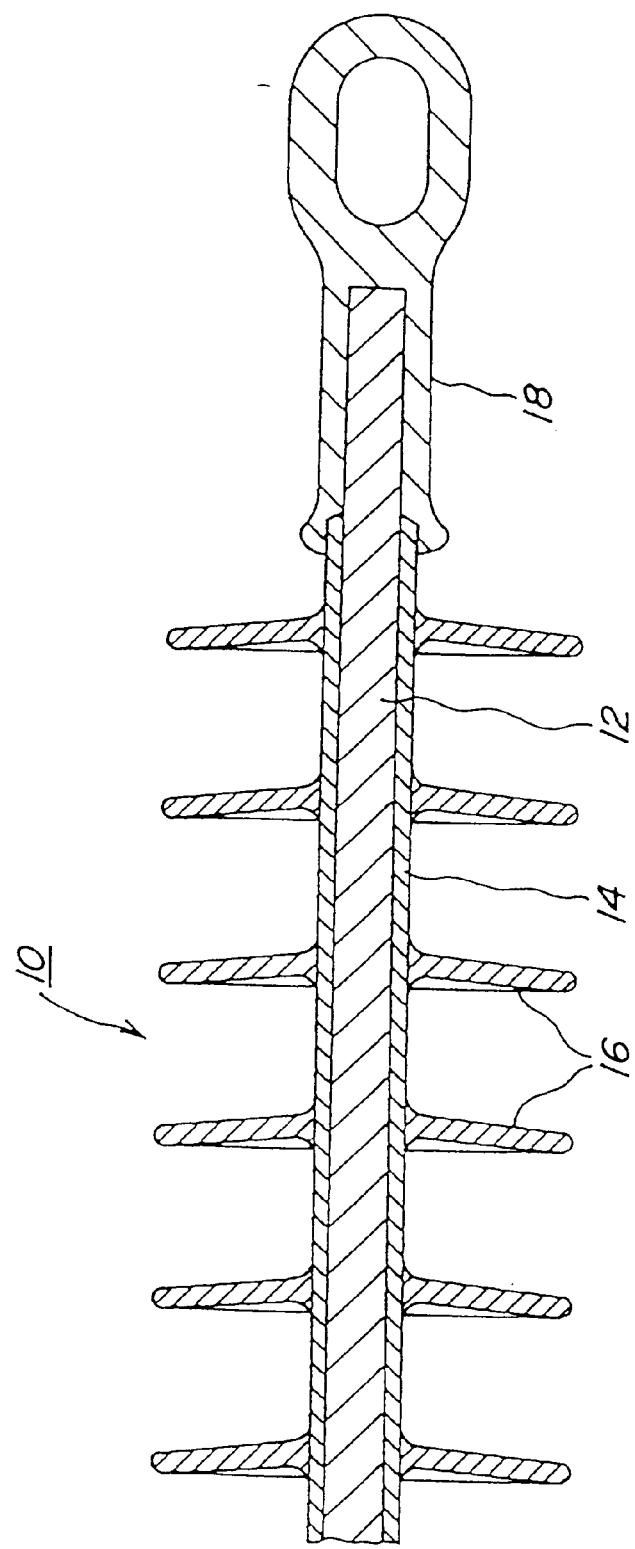
FIG._2

FIG_3
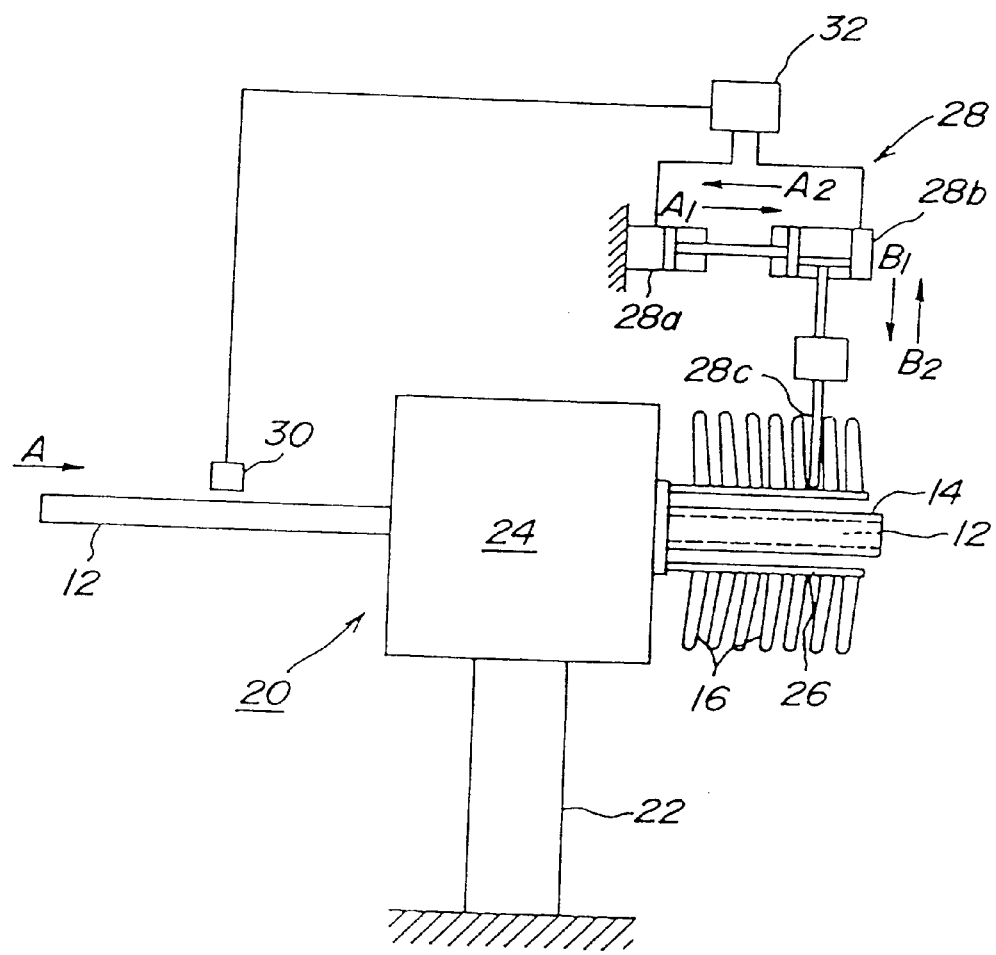

METHOD AND APPARATUS FOR MANUFACTURING COMPOSITE INSULATORS

BACKGROUND OF THE INVENTION

1. Field of the Invention

The present invention relates to a method and an apparatus for manufacturing composite electrical insulators made of polymeric material.

2. Description of Related Art

There is known a composite electrical insulator which includes an elongate and solid or hollow core rod of fiber-reinforced plastics (FRP), a sheath covering the core rod over substantially the entire length thereof, and a plurality of sheds projecting radially outwards from the sheath and spaced from each other in a longitudinal direction of the core rod. The sheath and the sheds are integrally formed on the core rod by injection or transfer molding of appropriate polymeric material having an electrically insulating property, such as silicone rubber, ethylene propylene copolymer (EPM), ethylene propylene diene copolymer (EDPM), polyurethane, etc. Such a composite insulator has been actually put into practical applications, particularly in any use environment which can draw out various functional advantages of the composite insulator.

There have been various proposals regarding the technology for manufacturing composite insulators. For example, JP-A-54-65392 discloses a method for manufacturing composite insulators wherein the sheds are mounted onto the sheath on the core rod in their radially expanded state, and carried on the sheath by a clamping force which arises from a radial shrinkage and adhered thereto by an adhesive agent. This method suffers from a problem that it is difficult to improve the manufacturing productivity and assembling accuracy, particularly when the sheds are mounted onto the sheath by a manual operation. Furthermore, JP-A-61-181015 discloses another method wherein the shed is caused to radially expand in a room temperature condition, is cooled and mounted onto the sheath on the core rod in its expanded state, and is heated to the room temperature such that the shed undergoes a shrinkage so as to be tightly connected to the sheath. This method also suffers from a problem that it is difficult to improve the manufacturing productivity and assembling accuracy. Moreover, precise and strict temperature control is required for the sheds.

DISCLOSURE OF THE INVENTION

It is therefore a primary object of the present invention to provide a novel technology for manufacturing composite insulators, which makes it readily possible to improve the manufacturing productivity and assembling accuracy and which is suitable for an automated assembly of the sheds.

According to one aspect of the present invention, there is provided a method of manufacturing a composite insulator which includes a core rod, a sheath covering the core rod over substantially the entire length thereof, and a plurality of sheds projecting radially outwards from the sheath and spaced from each other in a longitudinal direction of the core rod, wherein said method comprises the steps of:

setting a predetermined number of sheds onto a support member having a center opening therein and arranged on a downstream side of an extruder;

feeding a core rod to the extruder while extruding an electrically insulating polymeric material from the extruder to form a sheath on the core rod, and moving the core rod and the sheath toward the downstream side through said opening in the support member;

sequentially moving the sheds on the support member toward the downstream side and transferring the sheds onto respectively predetermined locations on the sheath which have passed through said opening in the support member and reached the downstream side, thereby forming an assembly which is comprised of said core rod, said sheath which has been formed on the core rod, and said sheds which have been transferred onto the sheath; and heating said assembly and thereby vulcanizing the sheath and adhering the sheath to the core rod and the sheds.

According to another aspect of the present invention, there is provided an apparatus for manufacturing a composite insulator which includes a core rod, a sheath covering the core rod over substantially the entire length thereof, and a plurality of sheds projecting radially outwards from the sheath and spaced from each other in a longitudinal direction of the core rod, wherein said apparatus comprises:

an extruder for extruding an electrically insulating polymeric material while it is fed with a core rod, to thereby form a sheath on the core rod;

a support member arranged on a downstream side of the extruder, said support member having a center opening therein and being adapted to support a predetermined number of sheds thereon;

a drive means for sequentially moving the sheds on the support member toward the downstream side, and sequentially transferring the sheds onto respectively predetermined locations on the sheath which have passed through said opening in the support member and reached the downstream side, thereby forming an assembly which is comprised of said core rod, said sheath which has been formed on the core rod, and said sheds which have been transferred onto the sheath; and a heating means for heating said assembly and thereby vulcanizing the sheath and causing the sheath to adhere to the core rod and the sheds.

With the above-mentioned method or apparatus according to the present invention, composite insulators can be manufactured in the following manner. First of all, a predetermined number of prefabricated sheds are mounted onto the support member having a center opening therein, and the support member is set on the downstream side of the extruder. A core rod is fed to the extruder and an electrically insulating polymeric material is extruded from the extruder to form a sheath on the core rod. The core rod on which the sheath has been formed is transferred toward the downstream side, through the opening in the support member. On this occasion, the drive means is activated to sequentially move the sheds along the support member toward the downstream side and sequentially transfer the sheds onto the respectively predetermined locations of the sheath, which have passed through the opening in the support member and reached the downstream side, so as to form an assembly which is comprised of the core rod, the sheath formed on the core rod and the sheds mounted on the sheath. Finally, the assembly so formed is heated by the heating means to vulcanize the sheath and adhere it to the core rod and the sheds.

In this way, according to the present invention, a support member is set on the downstream side of the extruder, with a predetermined number of prefabricated sheds mounted thereon, and the drive means is actuated synchronously with the formation of the sheath by the extruder so as to sequentially move the sheds toward the downstream side. This allows the sheds to be mechanically transferred onto the respectively predetermined locations of the sheath which have passed through the opening in the support member and reached the downstream side. Therefore, the assembling operation of the sheds does not require troublesome manual handlings or strict temperature control, thereby making it readily possible to improve the manufacturing productivity and assembling accuracy of composite insulators.

It is particularly advantageous to provide appropriate control means for controlling the moving speed of the sheds on the support member toward the downstream side, so that the moving speed is synchronized with the extrusion speed of the sheath. In this instance, it is possible to prevent an undesirable axial force from being generated between the sheath and the sheds upon transfer of the sheds onto the sheath, so that they are applied with radial force only, which serves to further improve the assembling accuracy in a facilitated manner.

It is also advantageous for the extruder to be so arranged as to extrude the polymeric material substantially vertically downwards. Such an arrangement serves to exclude the influence of gravity during the production of the composite insulators.

Preferably, the support member is a thin-walled tubular member having an inner diameter which is slightly greater than the outer diameter of the sheath. In this instance, the tubular member may have a length which is sufficient for supporting at least one set of sheds for one composite insulator.

BRIEF DESCRIPTION OF THE DRAWINGS

The present invention will now be explained in further detail hereinafter, with reference to a preferred embodiment shown in the accompanying drawings, in which:

FIG. 1 is a block diagram showing a preferred embodiment of the method for manufacturing composite insulators according to the present invention;

FIG. 2 is a fragmentary longitudinal-sectional view of the composite insulator manufactured according to the present invention; and FIG. 3 is a schematic view showing the basic construction of an apparatus which can be used to carry out the method according to the present invention.

DETAILED DESCRIPTION OF THE PREFERRED EMBODIMENT

Referring now to FIG. 1, there is shown a block diagram of a preferred embodiment of the method for manufacturing composite insulators according to the present invention.

In the present invention, sheds for composite insulators are prefabricated by molding of an appropriate electrically insulating polymeric material, such as silicone rubber, which is followed by vulcanization of the rubber. The vulcanizing condition may be 140° C.×5 min., for example. After finishing of the sheds, a predetermined number of such sheds are set onto a hollow support member to be more fully described hereinafter. On the other hand, an FRP core rod is applied on its surface with an appropriate primer, and is then preheated to a temperature of 70° C., for example. The core rod under the preheated state is fed to an extruder, and a silicone rubber is supplied to an extruder and extruded therefrom, so as to form a sheath on the core rod. The temperature with which the silicone rubber is extruded from the extruder may be 70° C., for example. In a manner to be more fully described hereinafter, the sheds are mechanically assembled onto respectively predetermined locations of the sheath on the core rod. The resultant assembly, which is comprised of the core rod, the sheath and the sheds, is then heated under the condition of 120° C.×10 min., for example, so that the sheath is vulcanized and adhered to the core rod and the sheds. Finally, after the end finishing of the sheath, metal fittings are fixedly secured to the longitudinal end portions of the core rod to complete a composite insulator.

FIG. 2 is a fragmentary longitudinal-sectional view of the composite insulator manufactured by the above-mentioned method according to the present invention. It will be seen that the composite insulator 10 is comprised of a core rod 12, a sheath 14 formed on the core rod 12 by extrusion process, a plurality of sheds 16 mounted on the sheath 14, and metal fittings 18 fixedly secured to the end portions of the core rod 12.

FIG. 3 is a schematic view showing the basic construction of an apparatus 20 which can be used to carry out the method according to the present invention. The apparatus 20 includes, mounted on a base member 22, an extruder 24 which is fed with an FRP core rod 12. In this instance, it is assumed that the core rod 12 has already been applied with a primer and is in a preheated state. The extruder 24 serves to extrude a silicone rubber to form the sheath 14 on the core rod 12. On the downstream side of the extruder 24, i.e., the right side in FIG. 3, there is removably arranged a hollow support member 26 which supports thereon a predetermined number of sheds 16 in their radially expanded state. The support member 26 may be a thin-walled tubular member having an inner diameter which is slightly greater than the outer diameter of the sheath 14. A drive mechanism 28 for driving the sheds on the support member 26 is arranged adjacent to the support member 26. More particularly, the drive mechanism 28 is engageable with the sheds 16 on the support member 26 so as to displace the sheds 16 along the support member 26 toward the downstream side.

The drive mechanism 28 includes a first fluid cylinder device 28a having a plunger rod which can be reciprocated in axial directions A1, A2 in parallel with the feeding direction A of the core rod 12 to the extruder 24. The drive mechanism 28 further includes a second fluid cylinder device 28b which is secured to the plunger rod of the first cylinder device 28a. The second cylinder device 28b has a plunger rod which can be reciprocated in radial directions B1, B2 of the core rod 12. The drive mechanism 28 further includes a drive member 28c which is secured to the plunger rod of the second cylinder device 28b so as to be engageable with the shed 16 set on the support member 26.

In this instance, it is advantageous to provide a sensor 30 for detecting the feeding length of the core rod 12 to the extruder 24, at an appropriate location, e.g., on the upstream side of the extruder 24. The sensor 30 may be connected to a controller 32 which serves to control the operation of the cylinder devices 28a, 28b in accordance with the output signal of the sensor 30, i.e., the feeding length of the core rod 12 to the extruder 24.

With the apparatus 20 having the above-mentioned construction, the composite insulator 20 shown in FIG. 2 can be manufactured in the following manner.

First of all, the hollow support member 16 is set on the downstream side of the extruder 24, with a predetermined number of sheds 16 supported on the outer surface in their radially expanded state. The core rod 12 is fed to the extruder 24 in the direction shown by arrow A, while an electrically insulating polymeric material such as silicone rubber is extruded from the extruder 24 to form a sheath 14 on the core rod 12. The core rod 12 with the sheath 14 is moved toward the downstream side, through the opening in the support member 26. On such occasion, it is assumed that the plunger rod of the first cylinder device 28a is at a retracted position after having moved in a direction A2 which is opposite to the feeding direction A of the core rod 12 to the extruder 24, that the plunger rod of the second cylinder device 28b is at a radially inwardly extended position as shown by arrow B1, and that the drive member 28c is in engagement with the upstream side or back surface of the shed 16 which is supported by the support member 26 and situated at its leading end side.

When the plunger rod of the first cylinder device 28a is extended in the direction A1 which is the same as the feeding direction A of the core rod 12 to the extruder 24, the shed 16 in engagement with the drive member 28c is moved along the support member 26 toward the downstream side, and comes to be disengaged from the support member 26. As a result, the shed 16 which has been disengaged from the support member 26 is brought into engagement with a predetermined location of the sheath 14 and undergoes a radial shrinkage. By this, a first shed is mounted onto and assembled with the sheath 14.

In the next place, the plunger rod of the second cylinder device 28b is retracted radially outwards, as shown by arrow B2. The plunger rod is thereby displaced to a radially outer position so that the drive member 28c is out of engagement with the outer peripheries of the remaining sheds 16 which are still supported by the support member 16. Subsequently, the plunger rod of the first cylinder device 28a is retracted in the direction A2 which is opposite to the feeding direction A of the core rod 12 to the extruder 24. Then, the plunger rod of the second cylinder device 28b is extended radially inwards, as shown by arrow B1, so that the drive member 28c is brought into engagement with the outer periphery of the second shed 16 which is still supported by the support member 16. By extending the plunger rod of the first cylinder device 28a in the direction A1 which is the same as the feeding direction A of the core rod 12 to the extruder 24, the second shed 16 in engagement with the drive member 28c is moved along the support member 26 toward the downstream end thereof and transferred onto and assembled with the sheath 14.

By repeating the abovementioned operations, the required number of sheds 16 are mounted on respectively predetermined locations of the sheath 14. In this instance, it is of course that the operations of the cylinder devices 28a, 28b are controlled by the controller 32 according to the output signal of the sensor 30, i.e., the feeding length of the core rod 12 to the extruder 24. Incidentally, because the sheds are prefabricated separately from the sheath 14, the distance between the neighboring sheds 16 may be constant or variable in accordance with user's requirements. The distance between the neighboring sheds 16 can be adjusted by controlling the operational timing of the cylinder devices 28a, 28b by means of the controller 32.

In controlling the operations of the cylinder devices 28a, 2b by means of the controller 32, it is particularly advantageous to control the moving speed with which the sheds 16 are moved along and disengaged from the support member 16, so as to be synchronous with the extrusion speed of the polymeric material from the extruder 24, i.e., the formation speed of the sheath 14. In this instance, when the sheds are sequentially transferred onto the sheath 14, it is possible to prevent occurrence of an axial force between the sheath 14 and the sheds 16. Thus, it is only a radial shrinkage force which is applied from the sheds 16 to the sheath 14, and it becomes readily possible to maintain a highly improved assembling accuracy of the composite insulators.

Furthermore, while the extruder 24 has been illustrated in FIG. 3 as extruding the polymeric material in a horizontal direction, there may be instances wherein it is preferred to adopt a vertical arrangement so that the polymeric material is extruded vertically downwards, particularly when an elongate composite insulator is to be manufactured, thereby to exclude an adverse influence of gravity relative to the molding accuracy.

It will be appreciated from the foregoing description that, according to the present invention, a support member is set on the downstream side of the extruder, with a predetermined number of prefabricated sheds mounted thereon, and the drive means is actuated synchronously with the formation of the sheath by the extruder so as to sequentially move the sheds toward the downstream side. The sheds are thus mechanically transferred onto the respectively predetermined locations of the sheath which have passed through the opening in the support member and reached the downstream side. Therefore, the assembling operation of the sheds does not require troublesome manual handlings or strict temperature control, thereby making it readily possible to improve the manufacturing productivity and assembling accuracy of composite insulators.

While the present invention has been described with reference to specific embodiments, it should be noted that they were presented by way of examples only and various modifications and/or changes may be made without departing from the scope of the invention as defined by the appended claims.

What is claimed is:

1. A method of manufacturing a composite insulator which includes a core rod, a sheath covering the core rod over substantially the entire length thereof, and a plurality of sheds projecting radially outward from the sheath and spaced from each other in a longitudinal direction of the core rod, wherein said method comprises the steps of:

setting a predetermined number of prefabricated sheds onto a support member having a center opening therein and arranged on a downstream side of an extruder;

feeding a core rod to the extruder while extruding an electrically insulating polymeric material from the extruder to form a sheath on the core rod, and moving the core rod and the sheath toward the downstream side of the support member through the opening thereof;

sequentially moving the sheds on the support member toward the downstream side thereof and transferring the sheds onto respectively predetermined locations on the sheath which have passed through the opening in the support member and reached the downstream side thereof, thereby forming an assembly which is comprised of core rod, the sheath which has been formed on the core rod, and the sheds which have been transferred onto the sheath; and heating the assembly to vulcanize the sheath and adhere the sheath to the core rod and the sheds.

2. The method according to claim 1, wherein the polymeric material is extruded from the extruder at a predetermined extrusion speed, and the sheds on the support member are moved toward the downstream side thereof at a speed which is synchronized with said extrusion speed.

3. The method according to claim 1, wherein the polymeric material is extruded from the extruder substantially vertically downward.

4. An apparatus for manufacturing a composite insulator which includes a core rod, a sheath covering the core rod over substantially the entire length thereof, and a plurality of sheds projecting radially outward from the sheath and spaced from each other in a longitudinal direction of the core rod, wherein said apparatus comprises:

an extruder for extruding an electrically insulating polymeric material while it is fed with a core rod, to thereby form a sheath on the core rod;

a support member arranged on a downstream side of the extruder, said support member having a center opening therein and being adapted to support a predetermined number of prefabricated sheds thereon;

drive means for sequentially moving the sheds on the support member toward the downstream side of the support member, and sequentially transferring the sheds onto respectively predetermined locations on the sheath which have passed through said opening in the support member and reached the downstream side thereof, thereby forming an assembly which is comprised of core rod, the sheath which has been formed on the core rod, and the sheds which have been transferred onto the sheath; and heating means for heating the assembly to vulcanize the sheath and adhere the sheath to the core rod and the sheds.

5. The apparatus according to claim 4, wherein said extruder is adapted to extrude the polymeric material at a predetermined extrusion speed, further comprising control means for controlling a moving speed with which the sheds on the support member are moved toward the downstream side thereof, so that said moving speed is synchronized with said extrusion speed.

6. The apparatus according to claim 4, wherein said extruder is so arranged as to extrude the polymeric material substantially vertically downward.

7. The apparatus according to claim 4, wherein said support member comprises a thin-walled tubular member having an inner diameter which is slightly greater than an outer diameter of said sheath.

8. The apparatus according to claim 7, wherein said tubular member has a length which is sufficient for supporting at least one set of sheds for one composite insulator.

\* \* \* \* \*